United States Patent
G et al.

(10) Patent No.: US 12,326,804 B2
(45) Date of Patent: Jun. 10, 2025

(54) PLUG AND PLAY LANGUAGE ACCEPTANCE TESTING

(71) Applicant: SAP SE, Walldorf (DE)

(72) Inventors: Ajith G, Bangalore (IN); Sandeep Negi, Bangalore (IN); Ravikanth Malipeddu, Bangalore (IN); Naveen V, Hariharapura (IN); Shanavas Madeen S, Krishnagir (IN); Anurag Nayak, Bangalore (IN)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 18/071,795

(22) Filed: Nov. 30, 2022

(65) Prior Publication Data
US 2024/0176728 A1    May 30, 2024

(51) Int. Cl.
*G06F 11/3668*    (2025.01)
*G06F 9/451*    (2018.01)
*G06F 11/3698*    (2025.01)

(52) U.S. Cl.
CPC .......... *G06F 11/3698* (2025.01); *G06F 9/453* (2018.02); *G06F 11/3668* (2013.01); *G06F 11/3676* (2013.01); *G06F 9/454* (2018.02)

(58) Field of Classification Search
None
See application file for complete search history.

(56) References Cited

U.S. PATENT DOCUMENTS

| | | | | |
|---|---|---|---|---|
| 10,275,266 | B1 * | 4/2019 | Bhavineni | G06F 40/58 |
| 11,205,236 | B1 * | 12/2021 | Smith | G06N 3/08 |
| 2016/0162166 | A1 * | 6/2016 | Kleine-Horst | G06F 40/166 |
| | | | | 715/762 |
| 2016/0378514 | A1 * | 12/2016 | Bahgat | G06F 40/263 |
| | | | | 715/703 |
| 2019/0272590 | A1 * | 9/2019 | Marusic | G06Q 40/00 |
| 2021/0103515 | A1 * | 4/2021 | Jiang | G06F 40/143 |
| 2023/0138367 | A1 * | 5/2023 | Song | G06N 3/044 |
| | | | | 706/15 |
| 2023/0251961 | A1 * | 8/2023 | Schreiber | G06F 11/3692 |
| | | | | 717/124 |
| 2024/0134685 | A1 * | 4/2024 | Marks | G06F 9/4881 |

* cited by examiner

*Primary Examiner* — Jason D Mitchell
(74) *Attorney, Agent, or Firm* — Buckley, Maschoff & Talwalkar LLC

(57) ABSTRACT

According to some embodiments, systems and methods are provided including a memory storing program code to: execute a functional automation tool for an application under test in at least two languages, wherein execution of the functional automation tool includes a rendering of a plurality of user interfaces in each of the at least two languages; identify at least one of a label and a tooltip in each of the plurality of user interfaces; capture a screenshot for each of the plurality of user interfaces, wherein the captured screenshots include a first screenshot and at least one subsequent screenshot; identify the subsequent screenshot as unique or redundant; and render a language acceptance testing output for each unique screenshot, displaying each identified label and tooltip in the at least two languages. Numerous other aspects are provided.

17 Claims, 10 Drawing Sheets

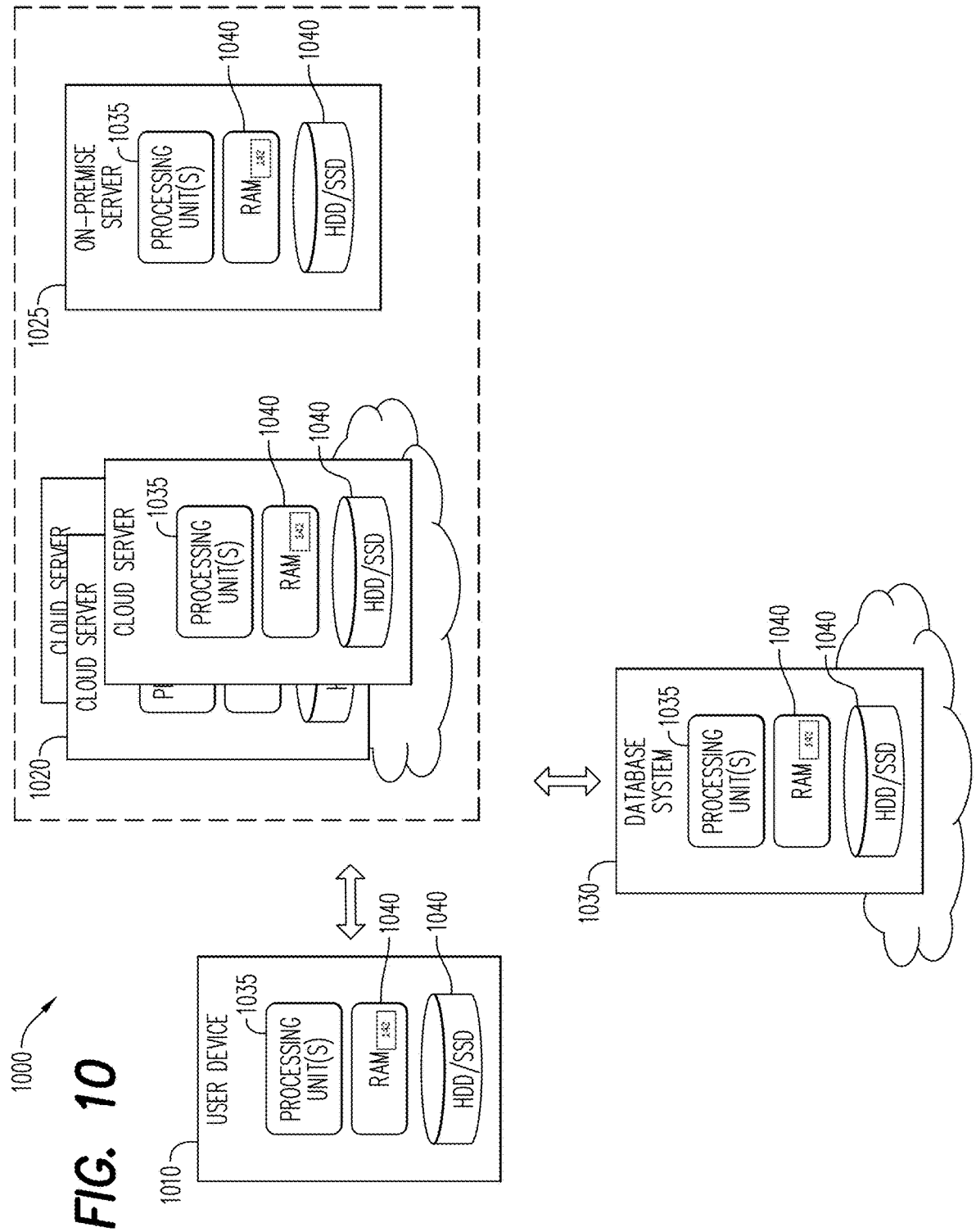

PLUG AND PLAY LANGUAGE ACCEPTANCE TESTING

BACKGROUND

Many organizations are increasingly dependent on software user interface (UI) applications, executed on premise or in the cloud, that are developed to address their needs. The UI applications may be tested by automation tools to verify functional and/or non-functional requirements via automated test scripts. The automation tool may be an application/software that is separate from the software being tested to control the execution of test scripts, and the comparison of actual outcomes with predicted outcomes. The automation tool may simulate the actions of an end user physically using the application, and the end user's interaction with web objects (e.g., elements on a web page including text, graphics, URLs and scripts). Many organizations may have users speaking different languages and need to support applications in multiple languages. To that end, many organizations may provide their UI applications in two or more languages. The organizations would like to ensure that the UI applications in the different languages meet the same product standard such that the application works seamlessly irrespective of the language in which the application is provided. For example, an application a user opens in the German language should reflect a same context with respect to text in the application as if opened in the French language. To that end, UI applications in different languages may be subject to Language Acceptance Testing.

While test automation tools are capable enough to execute in a functional test mode, they may not be capable enough to execute in a language test mode. As a non-exhaustive example, in terms of language testing, the test automation tool may not test whether a particular label on a screen says "customer" in English or German, rather it may just capture data that will be presented to the testers. Conventionally, the language acceptance testing process is a manual process including individual dedicated language testers who are experts in translation services and can validate text in an application in relation to organizational context (e.g., organization-specific application information, etc.) of the application and are an expert in at least two languages. The language acceptance tester may manually navigate the UI application being tested ("application under test") with the help of a test case document and may manually provide information about the language aspect of application under test. As a non-exhaustive example, the language acceptance tester reviews an application under test in English and in German to manually validate a field labeled "Customer" in the English application under test has the label "Kunde" in the German version of the same application under test. Each application includes multiple user interface ("UI") screens, and the language acceptance tester needs to review every word displayed on the screen and confirm each word is properly translated between the languages, which is a very labor-intensive process.

Systems and methods are desired which make it easier to perform language acceptance testing.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 10 is a block diagram of a cloud-based database deployment architecture according to some embodiments.

Figure 1:
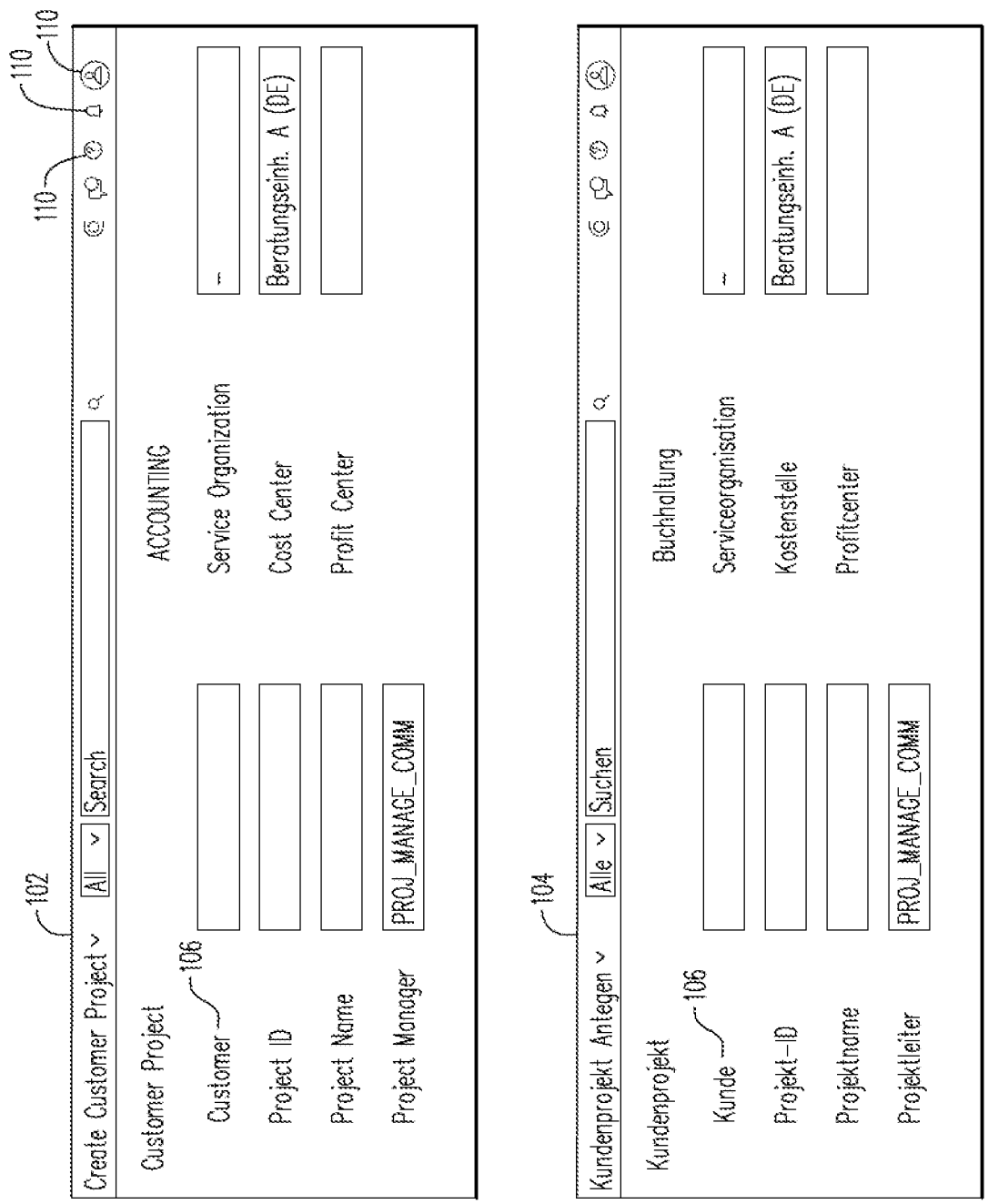
FIG. 1 is a diagram illustrating a user interface in a first language and the same user interface in a second language according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an automation tool may be used to verify function and/or non-functional requirements of a UI application via automated test scripts. As used herein, the terms "automated test script," "automate," "test," "script," and "automation" may be used interchangeably. The automate may simulate, or mimic, an end user's interaction with the UI application, and in particular, the web objects in the application. Data representing a UI of an application executing on a local computing system may be stored. Based on the stored data, an automation tool generates an automate to cause execution of simulated user interactions on the user interface of the locally-executed application. As also described above, a same application may be provided such that the UIs for the application are provided in different languages.

Figure 4:
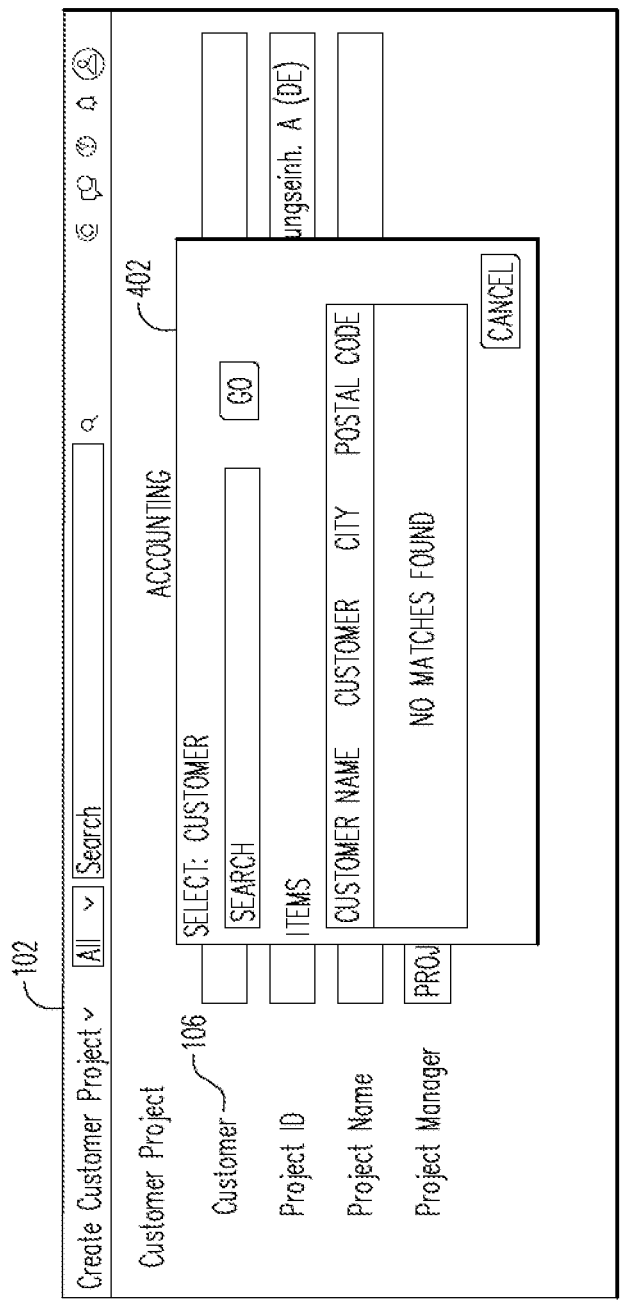
FIG. 4 is a diagram illustrating a user interface showing a tooltip according to some embodiments.

As a non-exhaustive example, FIG. 1 shows an UI 102 in English and the same UI 104 in German, as these UIs are provided by a same application but in different languages. Each UI includes a plurality of labels 106. For example, on the English UI 102, the labels 106 may be Customer Project, Customer, Project ID, Project Name, Project Manager, Accounting, Service Organization, Cost Center, Profit Center, Create Customer Project, All, Search. Similarly, on the German UI 104, the corresponding labels 106 may be Kundenprojekt, Kunde, Projekt-ID, Projektname, Projektleiter, Buchhaltung, Serviceorganisation, Kostenstelle, Profitcenter, Kundenprojeky anlegen, Alle, and Suchen. The labels in the two applications may have a one-to-one mapping, for example, "Customer" maps to "Kunde", "Project ID" maps to "Projekt-ID", etc. Although displayed in FIG. 4, FIG. 1 also includes tooltips 402 (FIG. 4) in each of the English UI 102 and the German UI 104. A tooltip is additional information that may be provided when a cursor hovers over something on the screen; it may be an additional explanation of what is displayed on the UI, and may only be provided when the cursor hovers over it. Tooltips 402 may be referred to as "hidden touch controls" that are unexposed, and based on some condition(s) they appear on the screen. While not always visible, the tooltips 402 are important for language testers to review. For example, if a term is too big for the structure of the visual display of the UI, like the word "manager", it may be shortened on the UI to "mngr." However, when a cursor hovers over the term "mngr" an additional pop-up may be provided that says "manager." Tooltips 402 may also be provided for icons. Non-exhaustive examples shown in FIG. 1 of icons 110 that would provide a tooltip 402 when a cursor hovers over them include, but are not limited to, a help icon, an alarm icon, a user icon. The tooltip 402 that pops up in FIG. 4 may be the result of a cursor hovering over the data entry field for the "Customer" label.

Conventionally, the automation tool does not perform language acceptance testing (LAT). Further, it is not a straightforward task to have the automation tool execute in a language testing mode and generate artifacts needed for language testing. A challenge with automating a language testing aspect is ensuring that the artifacts generated by the automation tools comply with a required format and structure so that all the artifacts may be easily integrated into a single platform. As such, conventionally, a language acceptance tester ("language tester") has two (or more) of a same automate executing simultaneously for a UI application under test in two or more languages, and for each screen (which includes labels and tooltips) that is displayed to the language tester during execution of the automate, the language tester manually compares the words displayed for the UI application under test in the first language with the words displayed for the UI application under test in the second language. As used herein, the terms "UI" and "screen" may be used interchangeably. This may be a time consuming and error prone task, as the language tester has to identify text on a first screen and then locate the same text in another language on a second screen and then determine whether they are the same. Additionally, there may be minor or no changes between the translation relevant information on multiple screens, but the language tester still needs to perform this analysis for each screen.

By virtue of some embodiments, a language module including a text and tooltip capturing element and a screenshot filtering element are provided. The language module may be provided as a microservice and may be consumed by the functional test automation tool, transforming the functional test automation tool into a language test automation tool. The language module may be consumed by any test automation tool.

The functional test automation tool may generate artifacts such as screenshots, labels and tooltips and post them to a central database, where they may be accessed by the language module. As used herein, a "label" 106 may refer at least to text on the screen. As used herein, a screenshot is an image that shows the contents of a computer display/screen. Screenshots capture exactly what is viewable on the screen. Embodiments provide for the artifacts used for language testing per a given language may be captured during execution of the automation tool, and collated centrally to be used by the language module. The text and tool capturing element may be run during execution of the test by the functional test automation tool and may capture the text and tooltips of all visible and hidden controls which are translation relevant. The text and tool capture element may map the captured text and tooltips to their corresponding translated text and tooltips from other language test executions. It is noted that the labels/tooltips in the base language and the comparison language may not be literal translations of each other, but they may be a contextual translation based on an organizational requirement. The screenshot filtering element may filter unique screenshots from all of the available screenshots captured during execution of the test by the functional test automation tool and may remove redundant screenshots in the test, reducing the screenshots (and labels and tooltips for the UI captured by the screenshot) that will be reviewed by the language tester. The screenshot filtering element may include a comparison percentage whereby a screenshot is considered redundant of another screenshot in a case that the labels and tooltips are the same within the given percentage. As a non-exhaustive example, as part of the functional automation test, as a first step a user enters a value in a first field, and as a second step the user enters a value in a second field. Each of these user-entry steps is a different screenshot, and while the input values may be different the text and tooltips of the visible controls remains the same. In this case, with the comparison percentage of 95%, a second screenshot of the second step is analyzed to determine whether it is 95% unique with respect to the text and tooltips of the visible and hidden controls as compared to a first screenshot.

Pursuant to some embodiments, the text and tooltip capture element may capture the labels and tooltips of the screens while the functional automation tool is executing a test to test the functionality of the UI application under test. The text and tooltip capture element may return two distinct arrays—one that includes labels, tooltips which are captured for a given screen and one that includes screenshots that are present for the given screen and actions performed. The screenshot filtering element may determine whether this given screen is unique as compared to other previously stored unique screenshots for this application in a base language. For the unique screenshots, the language module may output to the user a display including a side-by-side comparison of each of the labels on the screenshot in the two or more languages and a side-by-side comparison of each of the tooltips on the screenshot in the two or more languages.

Embodiments provide for a standardized approach to language testing of a UI application under test. An advantage of this standardization is that the information provided to the language tester is the same irrespective of the automation tool capturing the web objects. As described above, each automation tool may provide the web objects in a different way which may be difficult and more time consuming for language testers to review, since the data is always in a different layout. Another advantage provided by embodiments is the automated capture of the labels and tooltips in a first language and automated mapping to a second language, making for a more efficient and less error-prone process. Embodiments may also provide for reduction in used resources by only storing and reviewing screenshots (and the labels and tooltips on the UI for which the screenshot was captured) that are unique. The redundant screenshots may be flushed after a pre-defined time, increasing the storage capacity of the system. Additionally, by only transmitting the labels/tooltips for the unique screens to the language tester for review, the bandwidth of the system may be increased as compared to sending all of the labels/tooltips for all of the captured screens.

Figure 2:
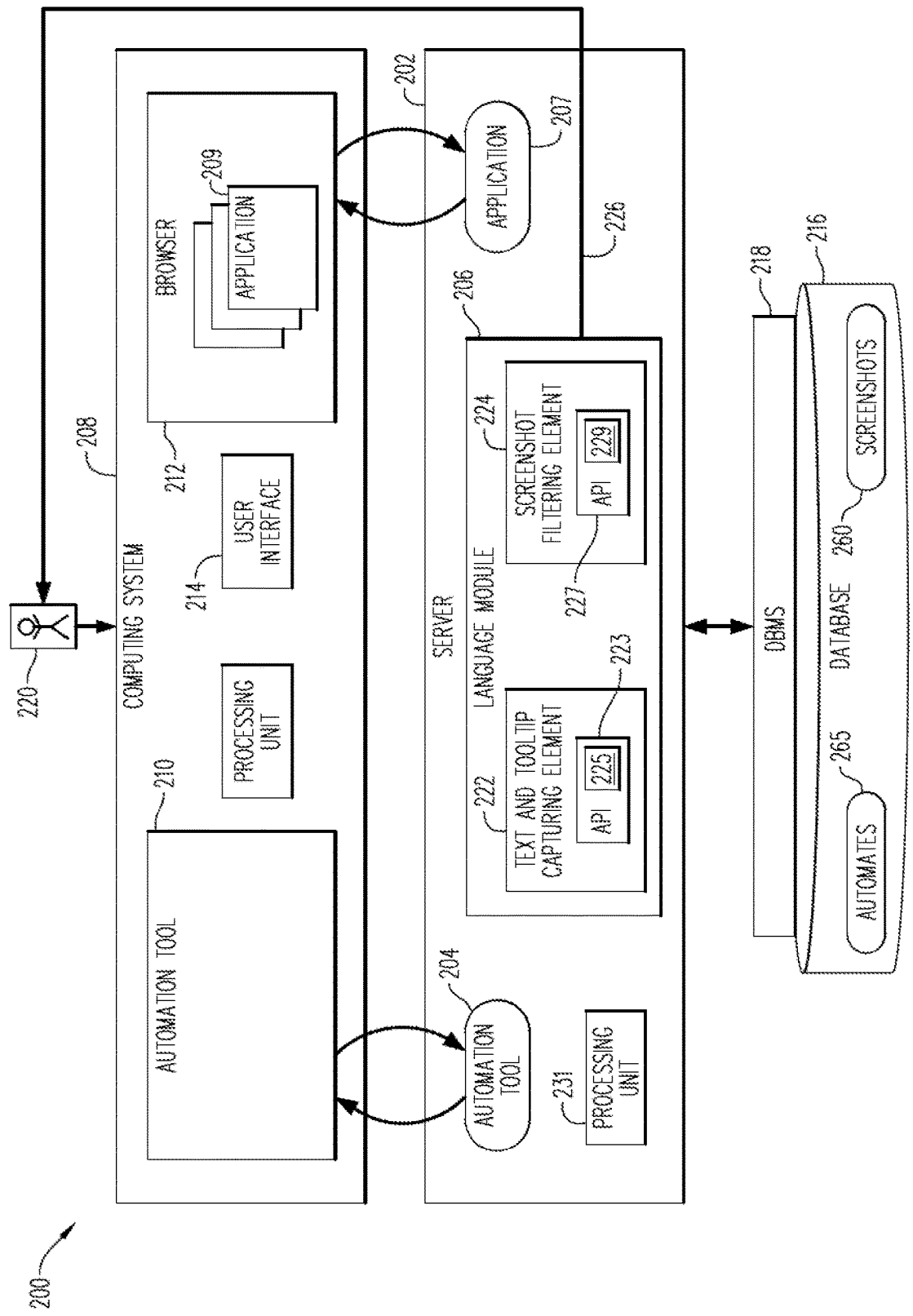
FIG. 2 is a block diagram of an architecture according to some embodiments.

FIG. 2 is a block diagram of an architecture 200 according to some embodiments. The illustrated elements of architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 200 are implemented by a single computing device, and/or two or more elements of architecture 200 are co-located. One or more elements of architecture 200 may be implemented using cloud-based resources, and/or other systems which apportion computing resources elastically according to demand, need, price, and/or any other metric.

Architecture 200 includes a backend server 202 including a remote cloud-based automation tool 204 and a remote cloud-based application 207, a language module 206, a local computing system 208 including a corresponding automation tool 210, browser 212 and user interface 214, a database 216, a database management system (DBMS) 218, and a client/user 220. As used herein, the terms "client", "user" and "end-user" may be used interchangeably. In some instances, the user 220 may be a language tester.

The backend server 202 may include applications 207. Applications 207 may comprise server-side executable program code (e.g., compiled code, scripts, etc.) executing within the backend server 202 to receive queries/requests from clients 220, via the local computing system 208, and provide results to clients 220 based on the data of database 216, and the output of the language module 206. A client 220 may access, via the local computing system 208, the language module 206 executing within the server 202, to analyze user interfaces in at least two different languages for a same application under test, as described below.

The server 202 may provide any suitable interfaces through which users 220 may communicate with the language module 206 or applications 207/209 executing thereon. The server 202 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 208 may comprise a computing system operated by local user 220. Local computing system 208 may comprise a laptop computer, a desktop computer, or a tablet computer, but embodiments are not limited thereto. Local computing system 208 may consist of any combination of computing hardware and software suitable to allow system 208 to execute program code to cause the system 208 to perform the functions described herein and to store such program code and associated data.

Figure 5:
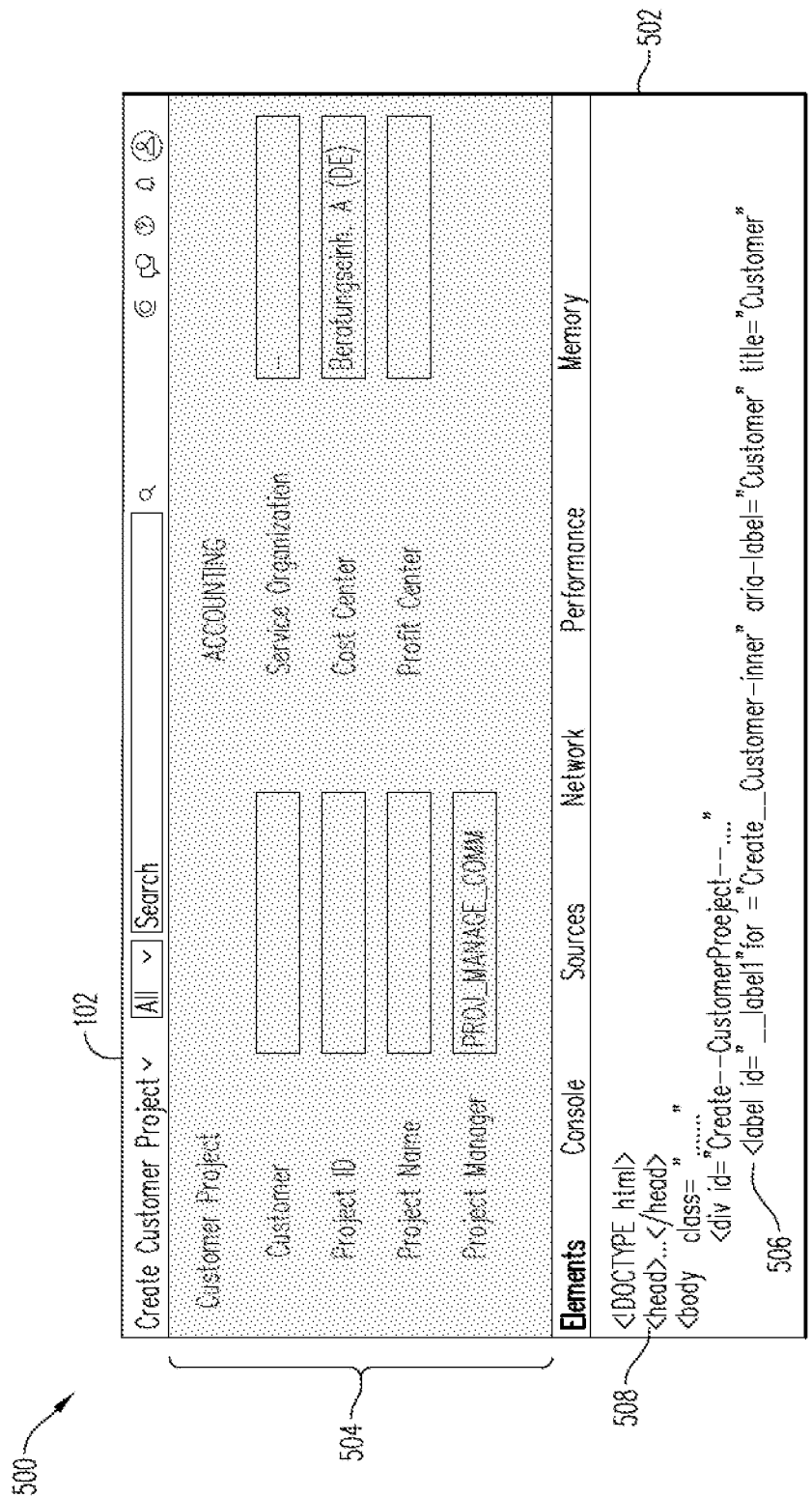
FIG. 5 is a diagram illustrating another user interface according to some embodiments.

Generally, computing system 208 executes one or more of applications 209 to provide functionality to user 220. Applications 209 may comprise any software applications that are or become known, including but not limited to data analytics applications. As will be described below, applications 209 may comprise web applications which execute within a web browser 212 of system 208 and interact with corresponding remote cloud-based applications 207 to provide desired functionality. User 220 may instruct system 208, as is known, to execute one or more of applications 207/209 under test and an associated automate 265 application for the application under test. The user 220 may interact with resulting displayed user interfaces 214—in the form of screenshots, in some embodiments—output from the execution of applications 207/209, to perform a comparison between the languages. Each application may include an Application Document Object Model, referred to herein as an "Application DOM" 502. An Application DOM is an API for Hyper Text Markup Language ("HTML") and Extensible Markup Language ("XML") documents on the web that define the logical structure of documents and the way a document is accessed and manipulated. The Application DOM 502 may treat an XML or HTML document as a tree structure wherein each node in the Application DOM 502 is an object representing a part of the document. For example, as shown in FIG. 5, the screen 500 displayed for an application has a particular HTML structure, which is the Application DOM 502. All of the labels, tooltips and other words provided on the shaded portion 504 of the screen are part of the Application DOM 502.

The automation tool 210 may access data in the database 216 and then may reflect/show that information on a user interface 214. The automation tool 210 may fetch the data from the database 216 so that it is provided at runtime. While discussed further below, the database 216 may store data representing the automates 265, screenshots 260 and other suitable data. The automates 265 may be used to test the application under test. Execution of the automate 265 may include performance, by an Application Programming Interface as a non-exhaustive example, of activities in a sequence designated by the automation tool 210 using a given payload. Database 216 represents any suitable combination of volatile (e.g., Random Access Memory) and non-volatile (e.g., fixed disk) memory used by system 208 to store the data.

The language module 206 may include a text and tooltip capturing element 222 and a screenshot filtering element 224. In some embodiments, each of the text and tooltip capturing element 222 and the screenshot filtering element 224 may provide micro-services that may be consumed by any test automation tool. Upon consuming the micro-services, the automation tool 210 may generate the web objects per the different languages, which in turn may be collated and posted to the database 216 to then be used by the language module 206 in language acceptance testing. As used herein, "language acceptance testing" (LAT) may refer to tests to determine whether the user interfaces for a given program provide the same information irrespective of being presented in different languages.

Pursuant to some embodiments, for an automation tool 210 to facilitate or take part in a LAT process, they may capture the screen (e.g., labels on the screen, hidden labels on the screen (e.g., tool tips), etc.) in the base language of comparison (e.g., English), and any of the other human languages (e.g., German, Japanese, French, etc.) in which the application runs/screens are displayed. The text and tooltip capturing element 222 may capture all of the controls (e.g., labels and tooltips) on each screen rendered during execution of an automate for the application under test by the functional automation tool 210. These controls may be captured for each human language in which the application under test may be executed. Additionally, the text and tooltip capturing element 222 may ensure there is a 1:1 mapping for the text that is captured. For example, in the base screen (FIG. 1), which is English for this example, the labels are captured in an order of the first captured label is "Customer", the second captured label is "Project ID" and the third captured label is "Project Name". When the text and tooltip capturing element 222 captures the same text for the German screen 104, it may capture the text in the same order, whereby the first captured label is "Kunde", the second captured label is "Projekt-ID" and the third captured label is "Projektname", making it easier for the tester to see how the text is translated in the different languages.

The text and tooltip capturing element 222 may include an Application Programming Interface (API) 223. Pursuant to some embodiments, the API 223 may be developed using Spring Boot® technology or any other suitable technology and may be deployed on any suitable platform, including, but not limited to, SAP Business Technology Platform (BTP). The API 223 may be a Representational State Transfer (RESTful) API that conforms to the constraints of REST architectural style and allows for interaction with RESTful web services. The text and tooltip capturing element 222 may employ "Code on Demand" whereby the automation tool 210 sends a request for the API 223 to the language module 206 via a GET call, and a response to the GET call is provided to the automation tool 210 as a JavaScript code 225 of the API 223. It is noted that while the response may be provided as a JavaScript code or a JavaScript engine, for ease of description, the phrase "JavaScript code" will be used in the following. The JavaScript code 225 may be inserted into the application under test by the automation tool 210 of the computing device 208 via the browser 212. Pursuant to some embodiments, the JavaScript code 225 may be inserted into the browser 212 and hook onto the Application DOM 502. The JavaScript code 225 may traverse the Application DOM 502 and capture the text labels and tooltips rendered on each screen during execution of the application under test per the automation tool 210. It is noted that the JavaScript code 225 may be inserted into any web application on a JavaScript enabled browser. In one or more embodiments, the text and tooltip capturing element 222 may then return 226 the captured text and tooltips from each language to the user 220 in a suitable format whereby the user may determine whether the text and tooltips for a first language match the text and tooltips for a second language.

The screenshot filtering element 224 may compare screenshot images and determine whether an image is distinct from other unique saved images by a threshold value (e.g., whether a second screenshot image is 95% unique as compared to a first screenshot). Consider, as a non-exhaustive example, the automate 265 is performing an action on the first three input fields on a UI, such as the UI 102 shown in FIG. 1. After the first action is completed by entering data in the first input field ("Customer"), a screenshot is captured. Then the second action is completed by the automate entering data in the second input field ("Project ID"), and a second screenshot is captured. Similarly, the third action is completed by the automate entering data in the third input field ("Project Name"), and then a third screenshot is captured. While the data entered in the fields is different, the screenshot after each of the second step and the third step is similar to the screenshot after the first step (and to each other) because the labels for the input fields are the same. Conventionally, a language tester would review each screenshot individually to determine whether the text and tooltips match the expected values. This conventional process is laborious and repetitive as the screenshots after steps 2 and 3 are the same as step 1, and the tester is testing the translation of the same screen again and again. To avoid having redundant screens to review, the screenshot filtering element 224 may review the screenshots and check whether each screenshot is unique. In a case the screenshot is at least the same, per the pre-defined threshold, as a previously captured screen ("redundant screenshot"), the screenshot filtering element 224 may discard the redundant screenshot. It is noted that the screenshot being captured and analyzed by the screenshot filtering element may be specific for each language. For example, in a case the automate is being executed for a base language of English, the filtering by the screenshot filtering element 224 compares the English screenshots to each other.

Figure 8:
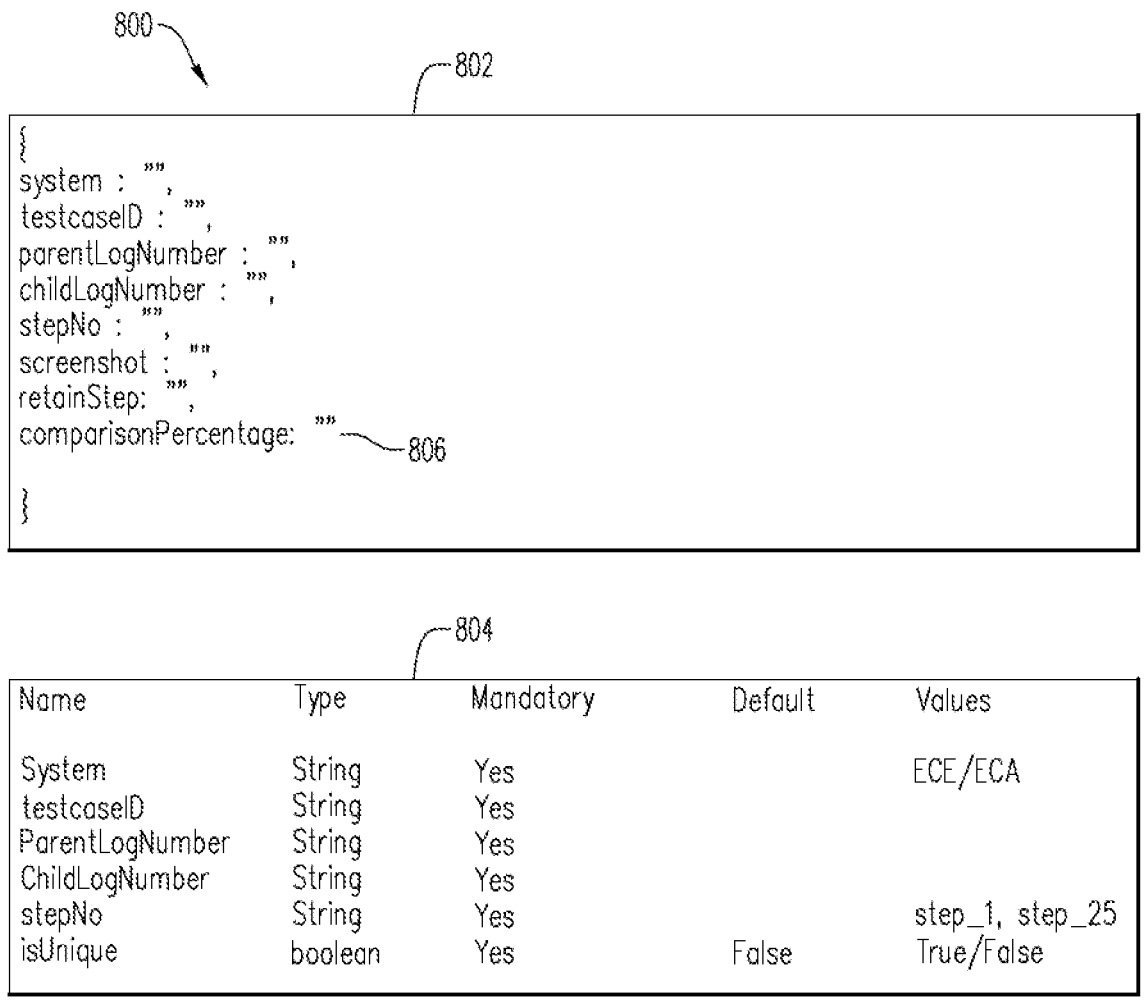
FIG. 8 illustrates a payload format and a table according to some embodiments.
Figure 9:
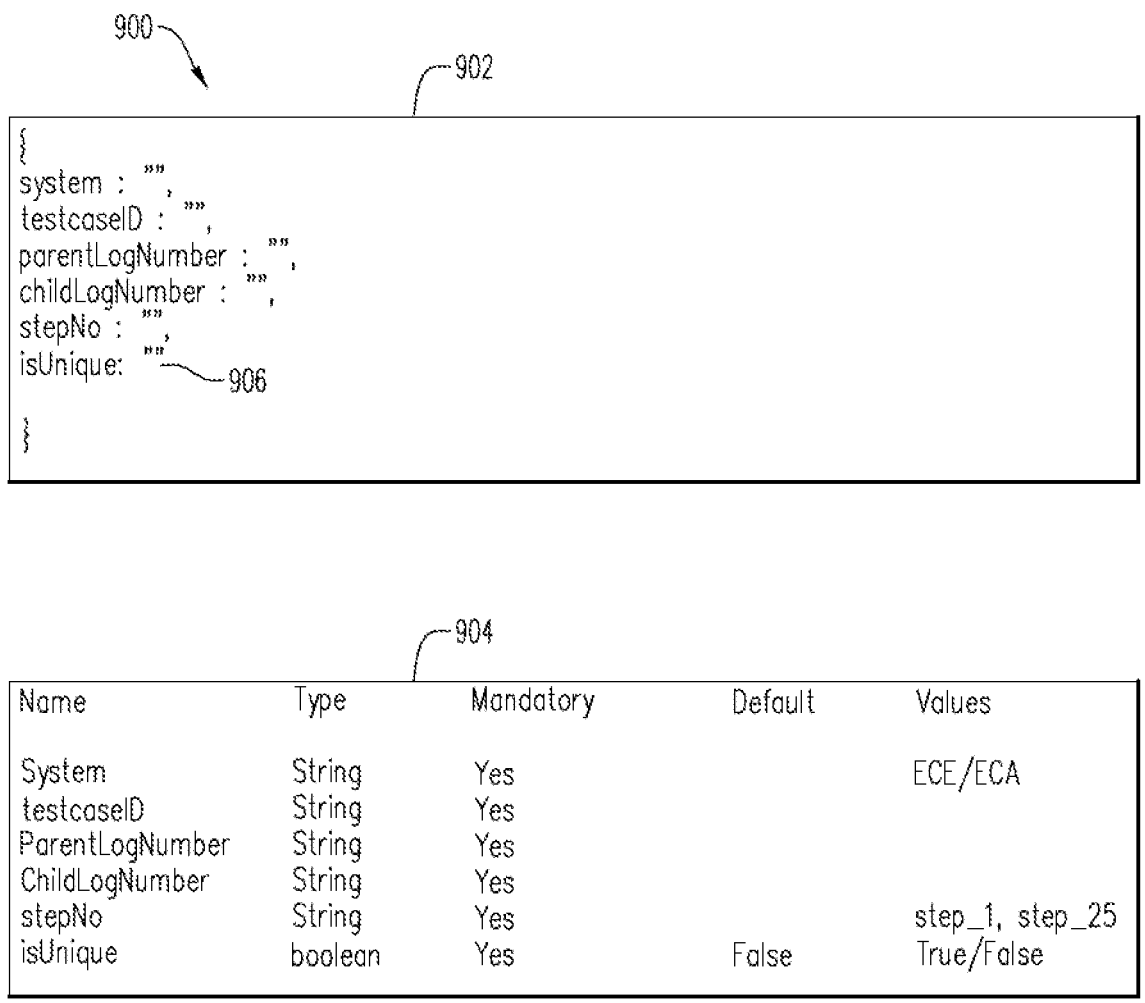
FIG. 9 illustrates a response format and a table according to some embodiments.

The screenshot filtering element 224 may be developed on Spring Boot® with Spring Web, Spring Data JPA and Postgre SQL driver dependencies, or any other suitable technology. In some embodiments, the screenshot filtering element 224 may be a Maven® project, with packaging as a Java Archive (JAR) file. It is noted that external automation tools may access the screenshot filtering element 224 with a POST API 227 request call. Since the screenshot filtering element 224 is accessed via a POST call, the automation tool 210 will pass some data to the screenshot filtering element 224 as a payload 800 (FIG. 8) in JSON format 802. The passed data may be the screenshot in the format of a particular payload 800. The payload 800 may include, but is not limited to, System name, Test case ID, Log Number, Step Number, Screenshot in byte stream format, and flag to skip comparison and retain step. Other parameters may be included in the payload, such as a parameter to decide on comparison percentage, as a non-exhaustive example. The "Screenshot" property may be where the screenshot is captured by the automation tool. The property may be converted into a particular format, and it will be passed in this format as a screenshot property to the screenshot filtering element 224. The "Step Number" property may refer to the step being executed by the automation tool 210. The "retain step" property may be a flag that may be used to override a unique comparison check. For example, in a case a screenshot is received and the "retain step" flag is marked as "yes," the screenshot filtering element 224 may identify the screenshot 260 as redundant in a unique comparison check but the "retain step" flag of "yes" will override the redundant status and will store the screenshot even though it is not unique. It is noted that in some instances, there may be a minimal change between screenshots (e.g., a change in a value supplied by a drop-down screen, such as GB for service organization in one screenshot and DE for service organization in another screenshot), such that one screenshot would be considered a redundant of the other screenshot, but the organization executing the automate wants both of these values to be captured for review by the language tester, so they may override the unique comparison check with the retain step flag. After determining the screenshot is unique via a Java code 229, the screenshot filtering element 224 may store the data for the unique screenshots in a SQL table, or other suitable storage. The payload 800 for the screenshots 260 may be stored as an entry in a SQL table 804 with system name, test case id, log number and step number comprising a primary key. In one or more embodiments, the screenshot filtering element 224 may return a response 900 (FIG. 9) in a response format 902 indicating whether the screenshot is unique or redundant. The response format 902 may include, but is not limited to, System name, Test case ID, Parent Log Number, Child Log Number, step Number, and unique flag. The response 900 may be stored as an entry in the SQL table 904. It is noted that the entries in the SQL table may be flushed in a pre-defined time.

One or more applications 207/209 executing on backend server 202 or local computing system 208 may communicate with DBMS 218 using database management interfaces such as, but not limited to, Open Database Connectivity (ODBC) and Java Database Connectivity (JDBC) interfaces. These types of applications 207/209 may use Structured Query Language (SQL) to manage and query data stored in database 216.

DBMS 218 serves requests to store, retrieve and/or modify data of database 216, and also performs administrative and management functions. Such functions may include snapshot and backup management, indexing, optimization, garbage collection, and/or any other database functions that are or become known. DBMS 218 may also provide application logic, such as database procedures and/or calculations, according to some embodiments. This application logic may comprise scripts, functional libraries and/or compiled program code. DBMS 218 may comprise any query-responsive database system that is or becomes known, including but not limited to a structured-query language (i.e., SQL) relational database management system.

Backend server 202 may provide application services (e.g., via functional libraries) which applications 207/209 may use to manage and query the data of database 216. The application services can be used to expose the database data model, with its tables, hierarchies, views and database procedures, to clients. In addition to exposing the data model, backend server 202 may host system services such as a search service.

Database 216 may store data used by at least one of: applications 207/209 and the language module 206. For example, database 216 may store the screenshots and/or automates which may be accessed by the language module 206 during execution thereof.

Database 216 may comprise any query-responsive data source or sources that are or become known, including but not limited to a structured-query language (SQL) relational database management system. Database 216 may comprise a relational database, a multi-dimensional database, an extensible Markup Language (XML) document, or any other data storage system storing structured and/or unstructured data. The data of database 216 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 202/local computing system 208.

For example, a client 220 may execute a Web Browser to request and receive a Web page (e.g., in HTML format) from a website application 207 of backend server 202 to provide the UI 102, 214, 500, 600 via HTTP, HTTPS, and/or WebSocket, and may render and present the Web page according to known protocols.

Figure 3:
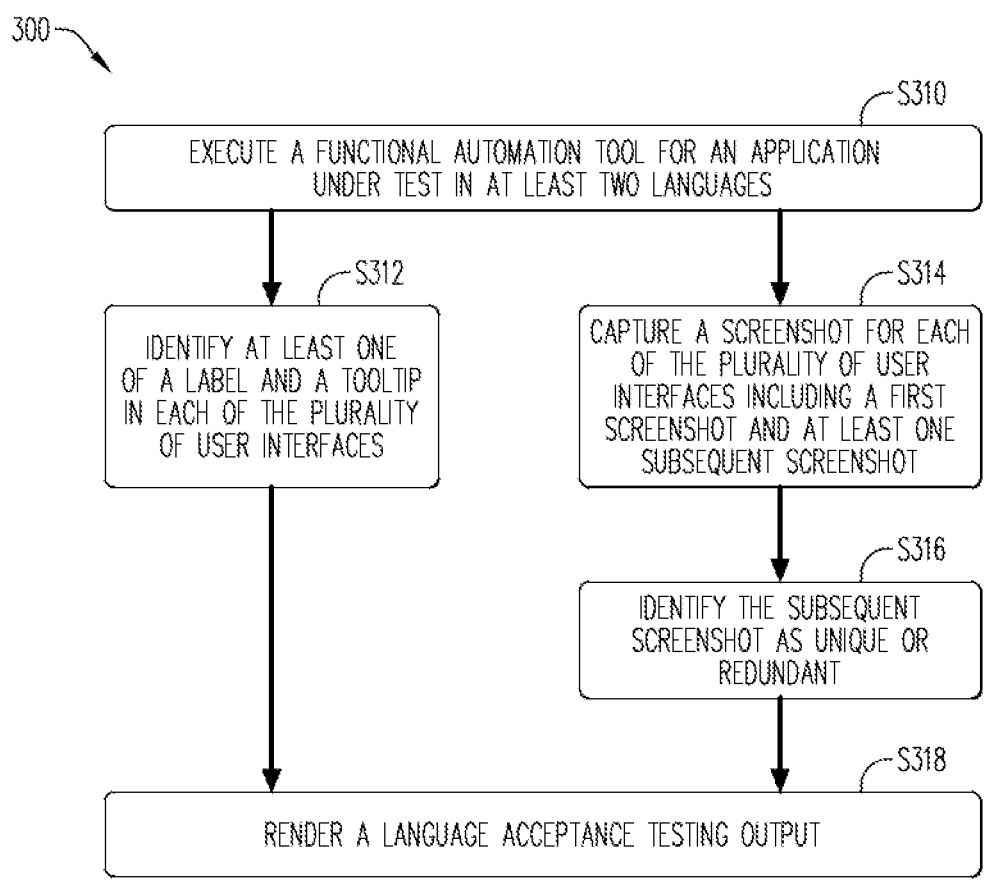
FIG. 3 is a flow diagram of a process according to some embodiments.

FIG. 3 illustrates a method 300 of rendering a user interface for a language acceptance testing, in accordance with an example embodiment. For example, the method 300 may be performed by a database node, a cloud platform, a server, a computing system (user device), a combination of devices/nodes, or the like, according to some embodiments. In one or more embodiments, the computing system 208 or backend server 202 may be conditioned to perform the process 300, such that a processing unit 231 (FIG. 2) of the system 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to execution of the process 300, a user 220 may select an application for testing 207/209 with the functional automation tool 210. The functional automation tool 210 may be of any suitable technology and may work on any suitable platform. Pursuant to some embodiments the language module 206 may be integrated as a service with the functional automation tool 210 such that execution of automation tool also executes the language module 206.

Initially, at S310 the functional automation tool 210 is executed for the selected application under test 207/209 in at least two languages. Execution of the functional automation tool 210 for the application under test 207/209 executes the application for every language that is available for the application to automatically test the functionality of the application under test. Execution of the functional automation tool 210 includes a rendering of a plurality of user interfaces in each of the at least two languages.

As described above, in embodiments, execution of the functional automation tool 210 includes the functional automation tool 210 sending a GET call to the language module 206 to request the API 223 for the text and tooltip capturing element 222. In response to the GET call, the automation tool 210 receives the JavaScript code 225 for the API 223 and inserts it into the browser 212 that accesses the application under test. As described above, the application under test includes an Application DOM 502 for each screen rendered for the application under test, as shown in FIG. 5. When inserted into the browser, the JavaScript code 225 traverses the Application DOM 502 for the given screen 500, for example, to identify in the Application DOM 502 at least one of a label 506 and a tooltip in S212 for that screen 500. As used herein, the label is the "text" that may be captured by the text and tooltip capturing element 222. It is noted that text in an input/data entry field is not relevant for translation and is excluded from identification by the text and tooltip capturing element 222.

The Application DOM 502 includes a plurality of HTML tags 508 that are marked by an angular bracket and are like keywords which define how the browser will format and display the content. A bracket with the text "label" denotes a label tag 506. For example, as shown in FIG. 5, <head>, <body class="_" etc. are HTML tags, and "<label id=" is the label tag 506 for label1 on the shaded portion screen ("shaded screen") 504. The HTML tag 508 may also include one or more properties defining the display of the content. In this non-exhaustive example, "for ="Create—Customer-inner" aria-label="Customer" title="Customer" describe the properties for this label, which is the label "Customer" on the shaded screen 504. In some embodiments, the JavaScript code 225 identifies the label 106 on the shaded screen 504 by identifying the label tag 506 in the Application DOM. The JavaScript code 225 may also identify the label 106 on the shaded screen 504 by identifying multiple properties that are related to a label in some way (e.g., aria-label, class equal to label, etc.) in the Application DOM 502. Similarly, a bracket with the text "title" denotes a tooltip tag (not shown) ("title tag").

In one or more embodiments, the JavaScript code 225 may extract the labels and tooltips in a top-down, right-to-left sequence, from the Application DOM 502 for each language. It is noted that the labels and the tooltips may be extracted in any other suitable sequence, provided the sequence is the same for each language. The JavaScript code 225 may extract the labels tooltips in a same sequence so that there is a one-to-one mapping of the text and tooltips between the screens for the different languages to later be used in a LAT output display for a language tester. The text and tooltip capturing element 222 may compare the hierarchical position of the labels tooltips in the Application DOM 502 for a first language to the hierarchical position of the labels tooltips in the Application DOM 502 for the second language, and each subsequent language, so that the text and tooltip capturing element 222 may output the similar elements in the different languages for comparison by the language tester. It is noted, for example, if the label "Customer" and "Project ID" were swapped on the screen, their position in the Application DOM 502 would also have switched.

In some instances, the automation tool 210 may run each language one after the other so that the API 223 extracts text/tooltips from English, for example, and then extracts text/tooltips from German, and then extracts text/tooltips from Japanese, etc. When the JavaScript 225 extracts the labels/tooltips for a first language, it identifies the location in the Application DOM 502 hierarchy for the given label tag 506/tooltip. Then, when the JavaScript 225 is extracting the labels/tooltips for a second/subsequent language, it identifies the same location in the Application DOM for the second/subsequent language to extract the same-meaning labels/tooltips from the second/subsequent language.

After the JavaScript code 225 identifies the labels and tooltips, the identified labels and tooltips are stored in a database or other suitable storage. This storage occurs for the identified labels/tooltips for each of the languages. In embodiments, the execution of the automation tool 210 (and therefore text and tooltip capturing element 222) may occur at a different time from the language tester performing the LAT. The LAT may include a language tester comparing data in different languages, in some instances via a side-by-side display, as described further below.

Turning back to the process 300, while the identification is occurring in S312, a screenshot 260 is captured for each of the plurality of user interfaces rendered during execution of the application under test by automation tool 210 in S314.

Similar to the description above, execution of the functional automation tool 210 includes the functional automation tool 210 sending a POST call to the language module 206 to send payload data 800 for each captured screenshot 260 to the screenshot filtering element 224 for execution thereof. Then the screenshot filtering element 224 identifies the screenshot as one of unique or redundant in S316. When a screenshot is received by the screenshot filtering element 224, it may be posted to the API 227.

The Java code 229 may then determine from the payload 800 for that screen whether the step number denotes a first step in the automate. As described above, the "Step Number" property may refer to the step being executed by the automation tool 210 per the automate.

In a case the step number indicates a first step, the screenshot is unique, as no previous screenshots for this application under test have been stored. In the case of a unique screenshot, the API 227 returns a response 900 with a unique flag 906 and stores the screenshot 260.

In a case the step number indicates this screenshot is not a first step, the Java code 229 may determine whether the retainStep flag 806 is "Yes" or "No". In a case the retainStep flag is "yes", the Java code 229 returns, via the API 227, a response 900 with a Unique flag, and stores the screenshot.

For each subsequent (after the first) screenshot posted to the API 227, the API 227 per the Java code 229, queries the SQL table 804 for existing screenshots stored with the same System, Testcase ID and Log number. In a case an entry is not found, the API 227 determines the screenshot is unique and returns a response 900 with a unique flag 906 and stores the screenshot 260. In a case an entry is found, the API 227 compares the instant screenshot with already existing images for screenshots in the SQL table 804, byte by byte, and determines whether the instant screenshot is unique as compared to the existing images by some pre-defined threshold value. For example, in a case the threshold value is 95%, the screenshot filtering element 224 checks whether the subsequent screenshot is 95% unique as compared to previously captured and stored unique screenshots. In a case the screenshot is 95% unique, then the unique flag may be set to "true", otherwise the unique flag may be set to "false". In a case the instant screenshot is unique, the API 227 will send the Response 900 as Unique and store the screenshot. In a case the instant screenshot is not distinct, the API 227 will send the response 900 as Not Unique/Redundant and discard the screenshot.

In some embodiments, the API 227 of the screenshot filtering element 224 may only be executed for comparing screenshots in a base language (e.g., English), and the Unique flags for the different screenshots may be stored for reference in other languages. It is further noted that the API 227 may flush the entries in the SQL table 804/904 in a pre-defined time.

As a non-exhaustive example of screenshot filtering, and with respect to the example described above, Step 1 may be data entry into the "Customer" field, Step 2 may be data entry into the "Project ID" field and Step 3 may be data entry into the "Project Name" field. Step 1 may pass as Step_1 to the screenshot filtering element 224 and the automation tool 210 will also pass screenshot in the format required by the screenshot filtering element 224 to the screenshot filtering element 224 by any suitable format modification process. In some embodiments, the automation tool 210 may modify the format of the screenshot so that it may be passed to the screenshot filtering element 224. Then the Java code 229 will check whether it's the first step. Since it is marked as Step_1, it is the first step for that execution and is therefore unique (e.g., there are no other unique stored screenshots that match this screenshot within the pre-defined threshold). This Step_1 screenshot will be stored, and a response 900 will be returned saying the screenshot is unique. In the SQL table there is a "unique flag", which is true in this case because it's the first step of the execution. Next, the second step executes and a screenshot for the second step is captured. A payload for the second step screenshot is sent to the screenshot filtering element 224 and it may be passed as Step_2, and the screenshot is also sent to the screenshot filtering element 224 in the appropriate format. Upon receiving both the step number and screenshot, the screenshot filtering element 224 checks whether this step is a first step. In this case, it's Step_2, so the screenshot filtering element 224 checks if the screenshot is unique or not (redundant) by comparing it to a previously captured and stored unique screenshot for this particular round of execution. In this case, the only difference between Step 1 and Step 2 is the data being entered in the data entry fields, so the screenshot for Step 2 is redundant of the screenshot for the previously recorded step—Step 1, in this case. As such, the value for the unique flag will be returned as "false".

Returning to the process 300, in S318, the language module 206 transmits an output 226 of the language module 206 and renders a Language Acceptance Testing (LAT) Output 614 displayed on a user interface 600. The LAT Output 614 is rendered for each unique screenshot and displays each identified label and tooltip in the at least two languages. As described above, pursuant to some embodiments, the language tester 220 may call for the LAT Output 614 at a different session from when the automation tool is executed for the application under test. As a non-exhaustive example, the user interface 600 may be provided to the language tester. The language tester 220 may select a base language 602 (e.g., first language) in which to execute the screenshot filtering element 224 and a comparison language 604 (e.g., second language) to compare to the base language 602. It is noted that while only two languages are shown on the UI 600, more languages may be selected as comparison languages. The language tester 220 may also select a step 606 executed by the automate for which to retrieve one of screenshots, labels and tooltips, via an additional selection of a respective screenshots button 608, label button 610 and tooltip button 612. As shown in the non-exhaustive example provided by FIG. 6, the language tester selects English as a base language 602, German as the comparison language 604, and Step_1 as the selected step. The language tester has also selects screenshots, as indicated by the box surrounding the screenshot button 608 and the shading of the screenshot button 608. The selection may be indicated by any other suitable indicator. Selection of the screenshots button 608 results in the generation and rendering of the LAT Output 614. As shown herein, the LAT Output 614 in response to selection of the screenshots button 608 is a side-by-side display of the base language (English) screenshot for Step 1 and the comparison language (German) screenshot for Step 1.

Figure 6:
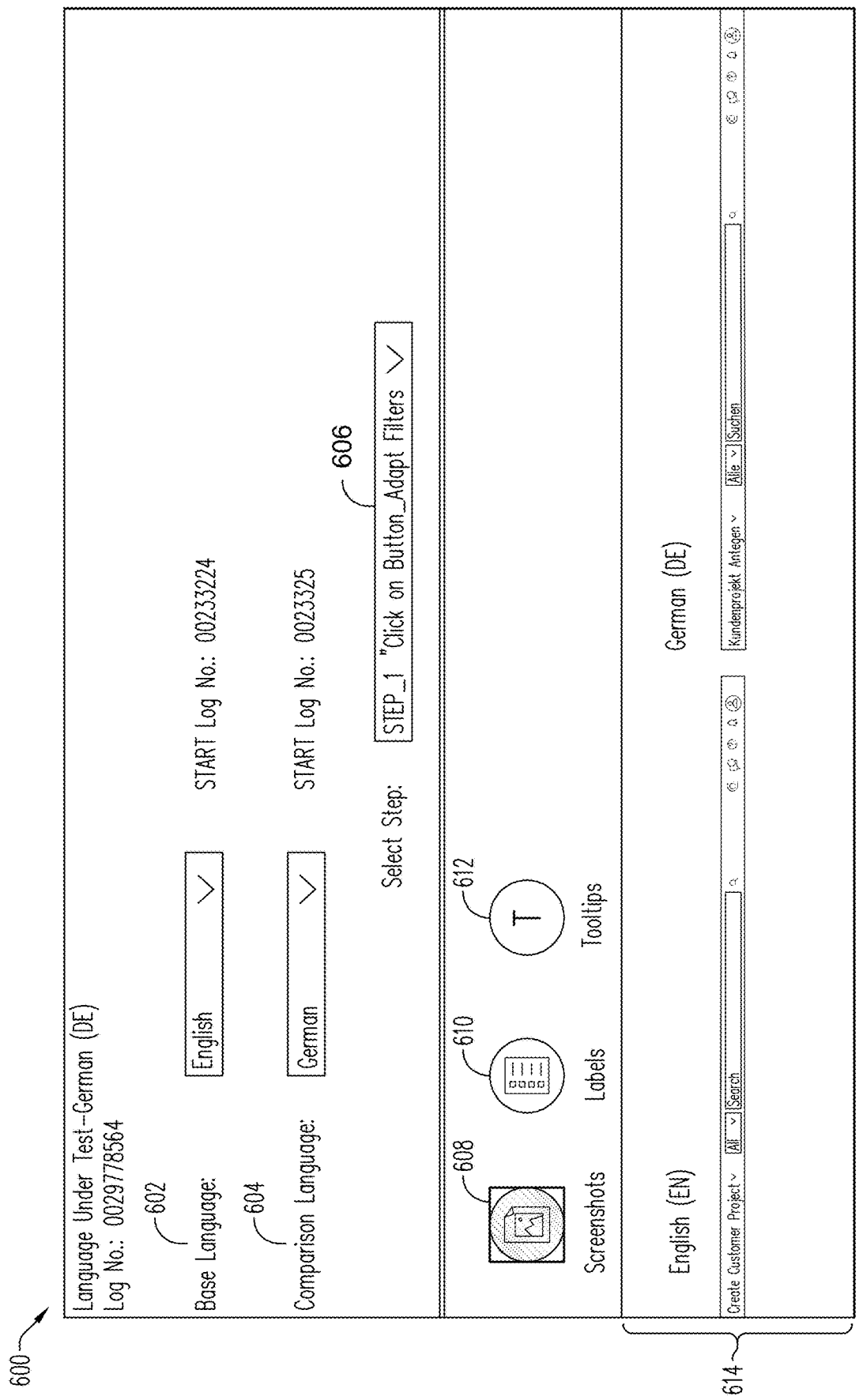
FIG. 6 is a diagram illustrating a user interface including an output according to some embodiments.
Figure 7:
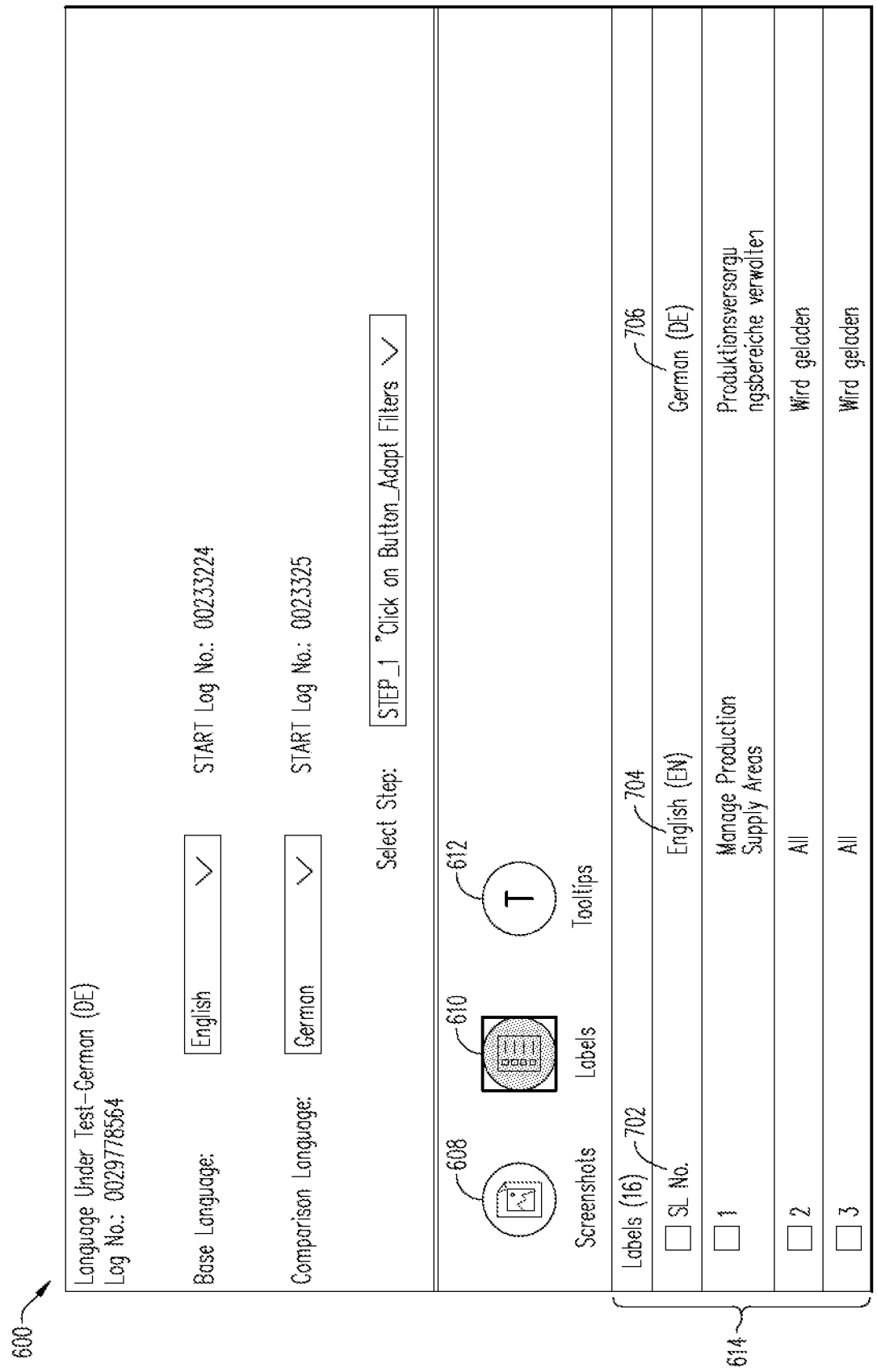
FIG. 7 is a diagram illustrating a user interface including another output according to some embodiments.

FIG. 7 provides the same UI 600 as displayed in FIG. 6, but instead of selection of the screenshot button 608, the language tester 220 selects the labels button 610. Selection of the labels button 610 results in the generation and rendering of the LAT Output 614. As shown herein, the LAT Output 614 includes a label number column 702, a base language column 704 and a comparison language column 706, with a one-to-one mapping of the labels in the first row. For example, the English label "Manage Production Supply Areas" in the base language column 704 is mapped to the German label "Produktionsversorgungs bereiche verwalten" in the comparison language column 706. As noted above, the labels/tooltips in the base language and the comparison language may not be literal translations of each other, but they may be a contextual translation based on an organizational requirement. Pursuant to some embodiments, when the language tester 220 analyzes the different screenshots, they do not have to review the image and instead may compare the labels and tooltips present on the screen via selection of the respective button. The inventors note that it may be more efficient for the language tester 220 to review text/labels in columns in a one-to-one mapping of the text/labels between the languages than to locate the same text/labels on the multiple screenshots and confirm their similarity or difference. The same efficiency may be had by selection of the tooltips button, where the tooltips in multiple languages will be displayed in the same fashion as the labels in response to selection of the label button. Additionally, pursuant to embodiments, the language tester 220 does not have to review the text/labels and tooltips for all of the screens rendered during execution of the automate as the screenshot filtering element 224 has removed the redundant screenshots and only unique screenshots are available to review. The language tester 220 may manually review the LAT output to determine whether the labels and tooltips contextually match between the languages. The language tester 220 may mark the screen to indicate one of: 1. the base language labels/tooltexts match the mapped comparison language label/tooltexts, and 2. at least one of the base language labels/tooltexts does not match the mapped comparison language label/tooltexts. In a case of a mis-match, correction of the mis-match may be made at a later time.

FIG. 10 illustrates a cloud-based database deployment 1000 according to some embodiments. The illustrated components may reside in one or more public clouds providing self-service and immediate provisioning, autoscaling, security, compliance and identity management features.

User device 1010 may interact with applications executing on one of the cloud application server 1020 or the on premise application server 1025, for example via a Web Browser executing on user device 1010, in order to create, read, update and delete data managed by database system 1030. Database system 1030 may store data as described herein and may execute processes as described herein to cause the execution of the language module for use with the user device 1010. Cloud application server 1020 and database system 1030 may comprise cloud-based compute resources, such as virtual machines, allocated by a public cloud provider. As such, cloud application server 1020 and database system 1030 may be subjected to demand-based resource elasticity. Each of the user device 1010, cloud server 1020, on premise application server 1025, and database system 1030 may include a processing unit 1035 that may include one or more processing devices each including one or more processing cores. In some examples, the processing unit 1035 is a multicore processor or a plurality of multicore processors. Also, the processing unit 1035 may be fixed or it may be reconfigurable. The processing unit 1035 may control the components of any of the user device 1010, cloud server 1020, on premise application server 1025, and database system 1030. The storage devices 1040 may not be limited to a particular storage device and may include any known memory device such as RAM, ROM, hard disk, and the like, and may or may not be included within a database system, a cloud environment, a web server or the like. The storage 1040 may store software modules 1042 or other instructions/executable code which can be executed by the processing unit 1035 to perform the method shown in FIG. 3. According to various embodiments, the storage device 1040 may include a data store having a plurality of tables, records, partitions and sub-partitions. The storage device 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code of a language module including a text and tooltip capture element and a screenshot filtering element; and
a processing unit to execute the processor-executable program code to cause the system to:
execute a functional automation tool for an application under test in at least two languages to automatically test a functionality of an application under test, wherein execution of the functional automation tool includes a rendering of a plurality of user interfaces in each of the at least two languages;
identify at least one of a label and a tooltip in each of the plurality of user interfaces via execution of the text and tooltip capture element;
capture a screenshot for each of the plurality of user interfaces, wherein the captured screenshots include a first screenshot and at least one subsequent screenshot;
identify the subsequent screenshot as unique or redundant via execution of the screenshot filtering element, wherein uniqueness identification is with respect to only the labels and tooltips of visible and hidden controls and uniqueness identification is by a comparison percentage as compared to any stored unique screenshots with respect to the labels and tooltips of visible and hidden controls; and
render a language acceptance testing output for each unique screenshot, displaying each identified label and tooltip in the at least two languages.

2. The system of claim 1, further comprising processor-executable program code to cause the system to:
store the screenshot identified as unique and discard the screenshot identified as redundant.

3. The system of claim 2, wherein the screenshot identified as unique is stored in a SQL table.

4. The system of claim 1, wherein the screenshot filtering element receives a payload for each screenshot in a JSON format.

5. The system of claim 1, wherein one of the at least two languages is a base language.

6. The system of claim 1, wherein the functional automation tool is executed on a browser and each of the user interfaces includes an application document object model (DOM).

7. The system of claim 6 wherein the text and tooltip capture element is a JavaScript code inserted into the application DOM.

8. The system of claim 7, wherein the JavaScript code traverses the application DOM identifying in the application DOM each label displayed on the user interface via a label tag and each tooltip displayed on the user interface via a title tag.

9. The system of claim 1, wherein in the rendered language acceptance testing output of each identified label and tooltip in the at least two languages, there is a one-to-one mapping of each label with respect to the at least two languages, and a one-to-one mapping of each tooltip with respect to the at least two languages.

10. The system of claim 1, wherein the language acceptance testing output is provided via a microservice to the functional automation tool.

11. A method comprising:
   executing a functional automation tool for an application under test in at least two languages to automatically test a functionality of an application under test, wherein execution of the functional automation tool includes a rendering of a plurality of user interfaces in each of the at least two languages and one of the languages is a base language;
   identifying at least one of a label and a tooltip in each of the plurality of user interfaces via execution of a text and tooltip capture element;
   capturing a screenshot for each of the plurality of user interfaces, wherein the captured screenshots include a first screenshot and at least one subsequent screenshot;
   identifying the subsequent screenshot as unique or redundant via execution of a screenshot filtering element, wherein uniqueness identification is with respect to only the labels and tooltips of visible and hidden controls and uniqueness identification is by a comparison percentage as compared to any stored unique screenshots with respect to the labels and tooltips of visible and hidden controls; and
   rendering a language acceptance testing output for each unique screenshot displaying each identified label and tooltip in the at least two languages.

12. The method of claim 11, further comprising:
   storing the screenshot identified as unique and discard the screenshot identified as redundant.

13. The method of claim 11, wherein the functional automation tool is executed on a browser and each of the user interfaces includes an application document object model (DOM).

14. The method of claim 13 further comprising:
   inserting the text and tooltip capture element into the application DOM.

15. The method of claim 14, wherein the text and tooltip capture element traverses the application DOM identifying in the application DOM each label displayed on the user interface via a label tag and each tooltip displayed on the user interface via a title tag.

16. A non-transitory, computer readable medium having executable instructions stored therein to perform a method, the method comprising:
   executing a functional automation tool for an application under test in at least two languages to automatically test a functionality of an application under test, wherein execution of the functional automation tool includes a rendering of a plurality of user interfaces in each of the at least two languages;
   identifying at least one of a label and a tooltip in each of the plurality of user interfaces via execution of a text and tooltip capture element;
   capturing a screenshot for each of the plurality of user interfaces, wherein the captured screenshots include a first screenshot and at least one subsequent screenshot;
   identifying the subsequent screenshot as unique or redundant via execution of a screenshot filtering element, wherein uniqueness identification is with respect to the labels and tooltips of visible and hidden controls and uniqueness identification is by a comparison percentage as compared to any stored unique screenshots with respect to the labels and tooltips of visible and hidden controls; and
   rendering a language acceptance testing output for each unique screenshot displaying each identified label and tooltip in the at least two languages.

17. The medium of claim 16, wherein the functional automation tool is executed on a browser and each of the user interfaces includes an application document object model (DOM); and
   the text and tooltip capture element traverses the application DOM identifying in the application DOM each label displayed on the user interface via a label tag and each tooltip displayed on the user interface via a title tag.

* * * * *